US007454488B2

(12) United States Patent
Wechter et al.

(10) Patent No.: US 7,454,488 B2
(45) Date of Patent: Nov. 18, 2008

(54) METHOD AND SYSTEM FOR MANAGING A NETWORK OF NODES

(75) Inventors: Gabriel Wechter, Ft. Collins, CO (US); Eric Pulsipher, Ft. Collins, CO (US); Max C. Knees, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 10/667,332

(22) Filed: Sep. 23, 2003

(65) Prior Publication Data

US 2005/0066020 A1 Mar. 24, 2005

(51) Int. Cl.
*G06F 15/173* (2006.01)
(52) U.S. Cl. ...................................... 709/223
(58) Field of Classification Search .................. 709/223
See application file for complete search history.

(56) References Cited

U.S. PATENT DOCUMENTS

| 5,528,516 | A | | 6/1996 | Yemini et al. | |
|---|---|---|---|---|---|
| 5,535,403 | A | | 7/1996 | Li et al. | |
| 5,661,668 | A | | 8/1997 | Yemini et al. | |
| 5,805,819 | A | * | 9/1998 | Chin et al. ................... | 709/224 |
| 6,154,220 | A | | 11/2000 | Prakriya et al. | |
| 6,249,755 | B1 | | 6/2001 | Yemini et al. | |
| 6,466,932 | B1 | * | 10/2002 | Dennis et al. ................... | 707/3 |
| 7,023,811 | B2 | * | 4/2006 | Pinto ........................... | 370/254 |
| 7,159,036 | B2 | * | 1/2007 | Hinchliffe et al. ........... | 709/242 |
| 7,328,260 | B1 | * | 2/2008 | Muthiyan et al. ........... | 709/224 |
| 7,398,307 | B2 | * | 7/2008 | Dorland ....................... | 709/223 |
| 2004/0061701 | A1 | * | 4/2004 | Arquie et al. ................ | 345/440 |
| 2005/0152289 | A1 | * | 7/2005 | Nagata et al. ................ | 370/256 |
| 2005/0286414 | A1 | * | 12/2005 | Young et al. ................ | 370/216 |

FOREIGN PATENT DOCUMENTS

WO WO03/058868 7/2003

OTHER PUBLICATIONS

S. Kliger et al., "A Coding Approach to Event Correlation", May 1995, pp. 1-13.
A Product of Smarts, "Event Modeling with the MODEL Language: A Tutorial Introduction", 1996, pp. 1-19.
A Product of Smarts, "High Speed & Robust Event Correlation", 1996, pp. 1-15.
Smarts, "How to Meet Scalability Requirements for Managing the World's Most Commplex IT Systems", Oct. 2002, pp. 1-14.
Smasrts, SMARTS InCharge MPLS IP VPN Manager, Sep. 2002, pp. 1-11.
Smarts, The InCharge Common Information Model, Mar. 2003, pp. 1-31.
UK Search Report dated Jan. 24, 2005.

* cited by examiner

*Primary Examiner*—Douglas B Blair

(57) ABSTRACT

An exemplary method for managing a network of nodes includes receiving information identifying the nodes of the network, and grouping the nodes into zones as a function of relationships among the nodes, such that each zone satisfies a threshold that is based on an operational capacity of a discovery agent assigned to discover the network. An exemplary system for managing a network of nodes includes means or a mechanism for receiving information identifying the nodes of the network, and grouping the nodes into zones as a function of relationships among the nodes, such that each zone satisfies a threshold that is based on an operational capacity of a discovery agent assigned to discover the network, and means or a mechanism for connecting to the network.

34 Claims, 6 Drawing Sheets

METHOD AND SYSTEM FOR MANAGING A NETWORK OF NODES

Related U.S. application Ser. No. 10/667,862 and identification number (20031114-1-1), entitled "Method and System for Determining a Network Management Scalability Threshold of a Network Manager with Respect to a Network", having as inventors Gabriel Wechter, Eric Pulsipher and Max Knees, filed in the U.S. Patent and Trademark Office on the same date as this application, is hereby incorporated by reference.

BACKGROUND

A network manager or management station that manages, monitors and/or discovers a network, may be unable to process the entire network as one batch of data, because attempting to do so would exhaust the system resources available to the network manager.

SUMMARY

An exemplary method for managing a network of nodes includes receiving information identifying the nodes of the network, and grouping the nodes into zones as a function of relationships among the nodes, such that each zone satisfies a threshold that is based on an operational capacity of a discovery agent assigned to discover the network. A machine readable medium can include software or a computer program or programs for causing a computing device to perform the exemplary method.

An exemplary system for managing a network of nodes includes means or a mechanism for receiving information identifying the nodes of the network, and grouping the nodes into zones as a function of relationships among the nodes, such that each zone satisfies a threshold that is based on an operational capacity of a discovery agent assigned to discover the network, and means or a mechanism for connecting to the network.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
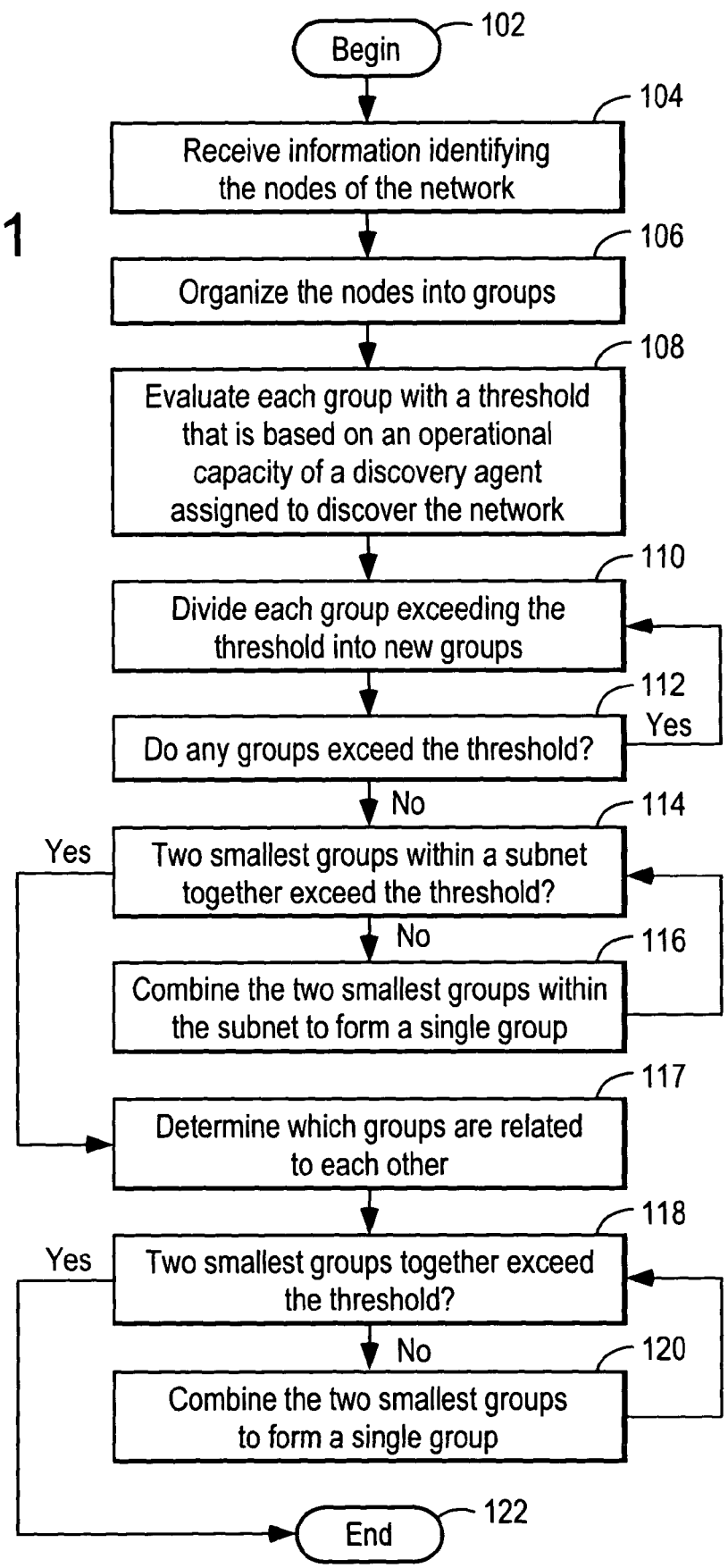
FIG. 1 illustrates an exemplary method.
Figure 2A:
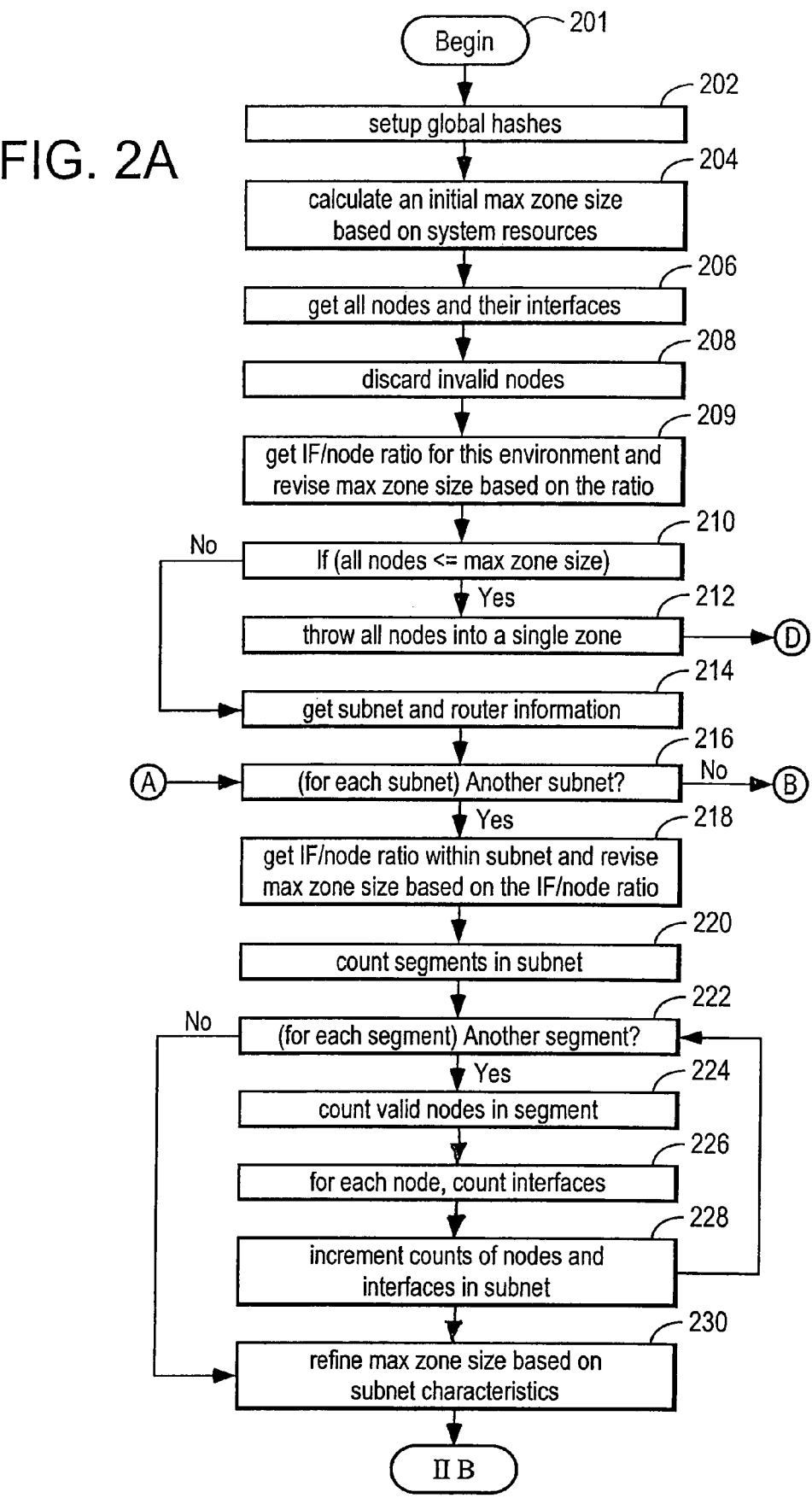
FIGS. 2A-2D illustrate an exemplary method.
Figure 2B:
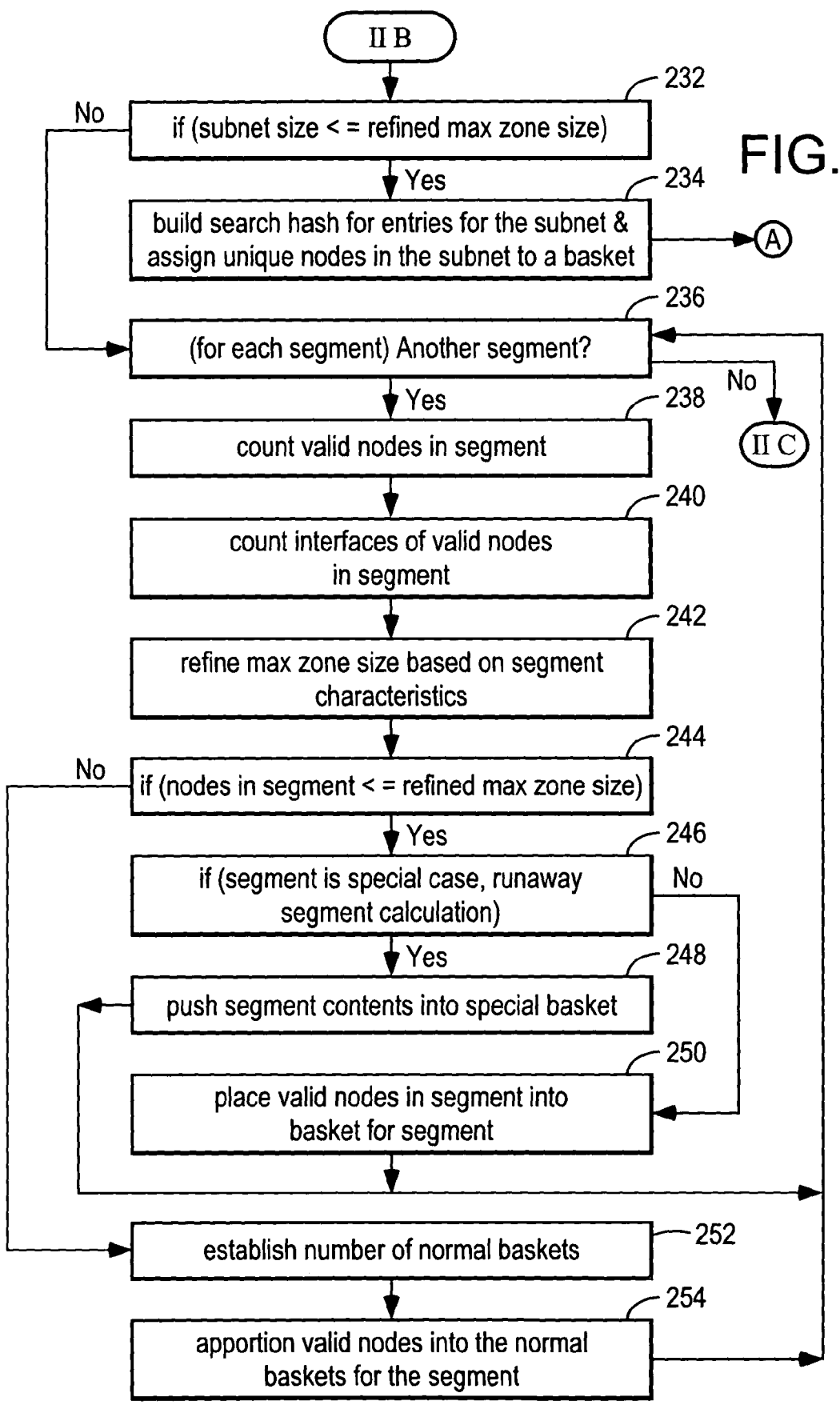
Figure 2C:
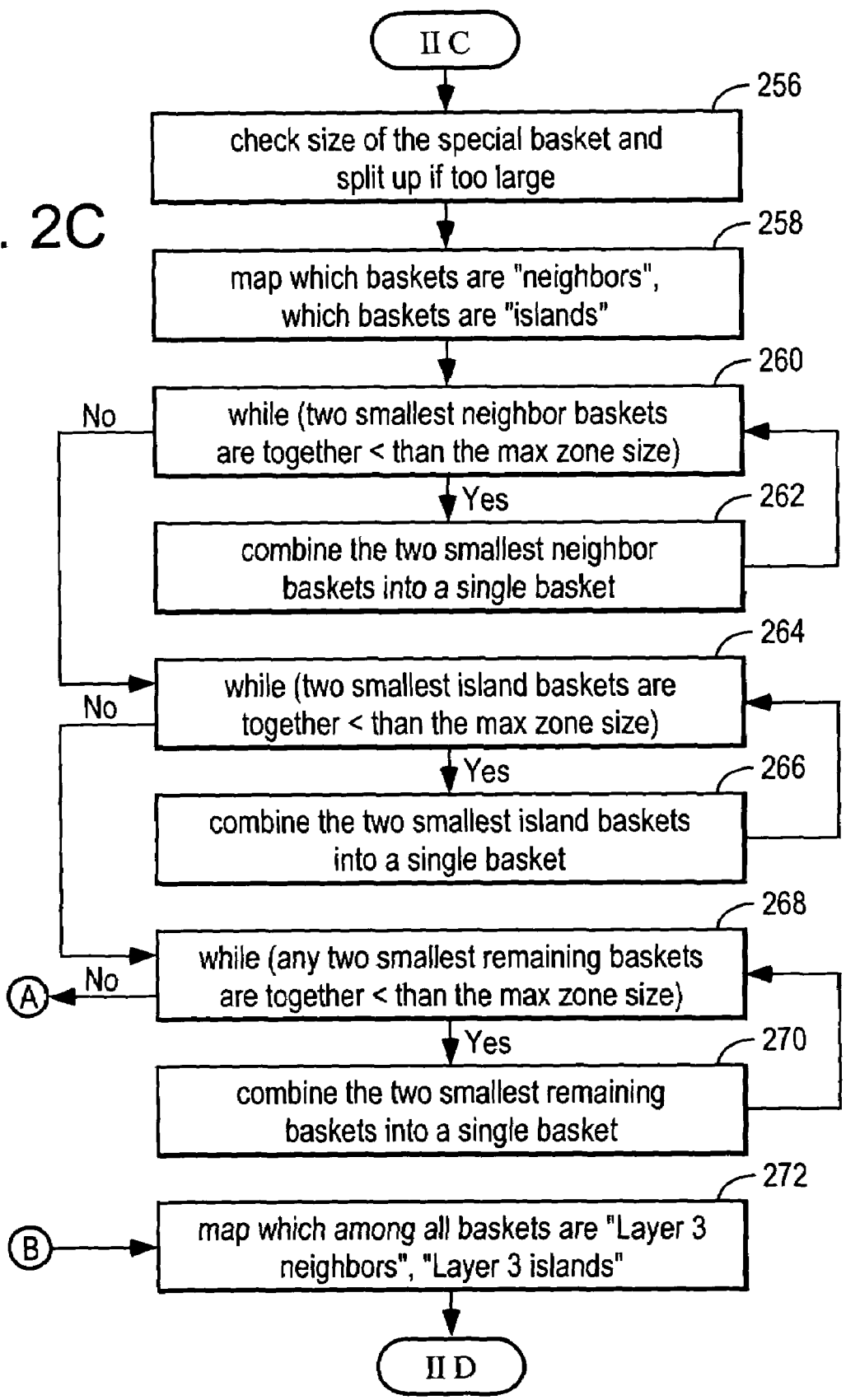
Figure 2D:
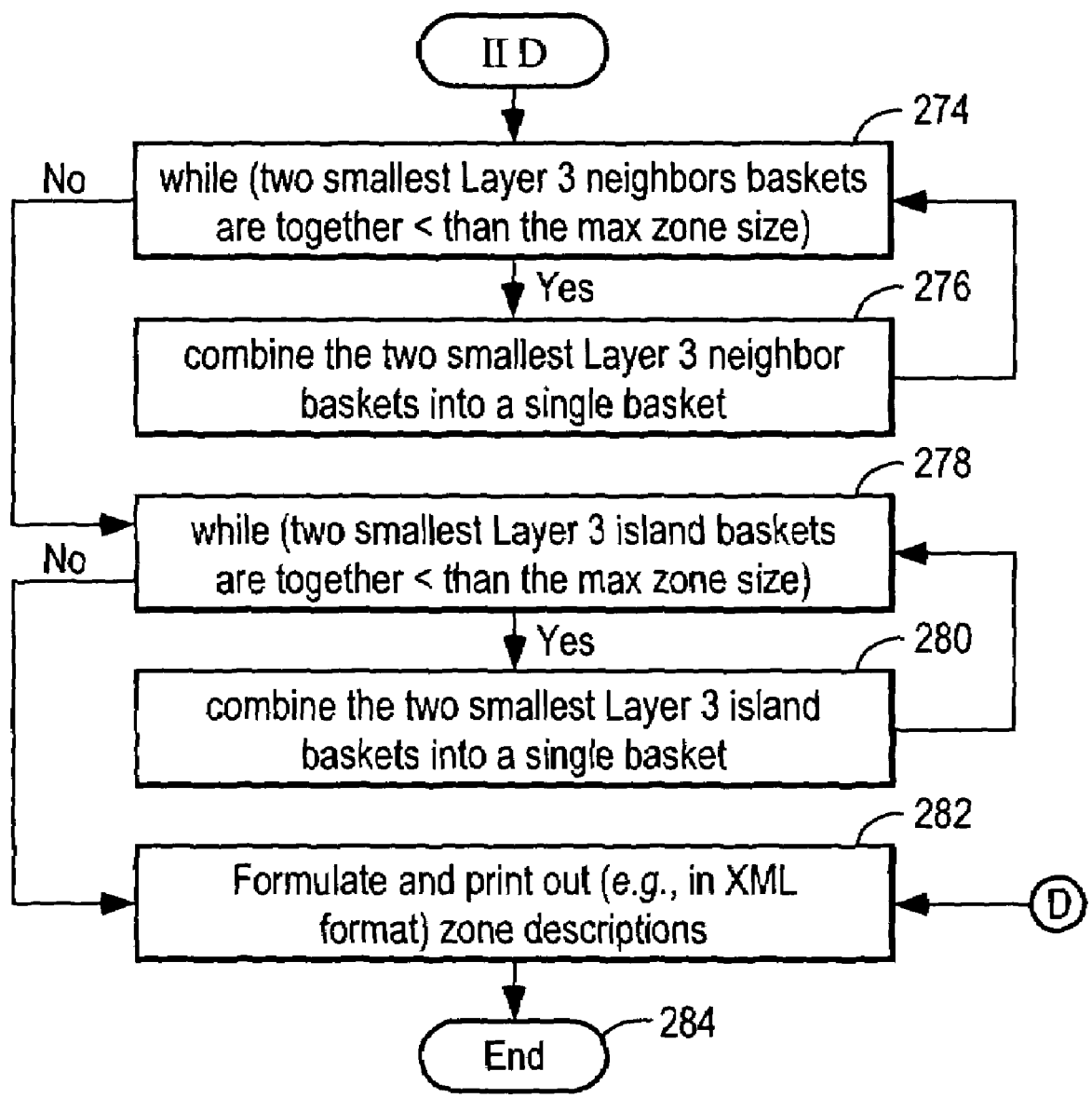

FIG. 1 illustrates an exemplary method for managing a network of nodes. As shown in FIG. 1, in a first block 102 the method begins. In a next block 104, information identifying the nodes of the network is received. In the following blocks, the nodes are grouped, for example into zones, as a function of relationships among the nodes, such that each zone or group satisfies a threshold that is based on an operational capacity of a discovery agent assigned to discover the network. The groups (at various stages of the method shown in FIG. 1, including at the end block 122) can for example be subnets, segments of subnets, and/or subsets of segments, or combinations of any of these (for example, with the combinations made based on physical and/or logical relationships between groups).

Control proceeds from block 104 to block 106, where the nodes are organized into groups. In block 108, each group is evaluated with respect to a threshold that is based on an operational capacity of a discovery agent assigned to discover the network. In block 110, each group exceeding the threshold is divided into new groups. Each group exceeding the threshold can be divided based on logical or physical relationships among elements within the group. For example, where a group to be divided is a subnet, the subnet can be divided into its component segments. In block 112, a check is performed whether any of the groups exceed the threshold. If yes, then control returns to block 110. If no, then control proceeds to block 114, where a check or test is performed whether the two smallest groups within a subnet together exceed the threshold. If no, then control proceeds to block 116, where the two smallest groups within the subnet are combined to form a single group. These two smallest groups that are combined can have (or can be required to have) at least one node (for example a switch) in common and/or another physical and/or logical relationship. Exemplary physical or logical relationships include: the two smallest groups belonging to the same segment; and the two smallest groups belonging to different segments, but having at least one node (or Layer 2 path, or physical connection) in common. The requirements can be ordered in a hierarchy. For example, the smallest groups having at least one node (or Layer 2 path, or physical connection) in common can be combined first, and then smallest groups (that together do not exceed the threshold) belonging to the same segment can be combined, or vice versa. A hierarchy of more than two levels can be used. For example, having at least one node in common can be given first priority, having at least one physical connection in common can be given second priority, and belonging to the same segment can be given third priority. These priorities can be differently ordered, for example any of the mathematically possible orderings of these three hierarchies can be used, as well as hierarchies of greater or lesser levels than three. For example, a last priority can be given to smallest groups that have no relationship other than they belong to the same subnet. Also, some or all of the relationships can be given a same priority, and/or all or only some or even none of the relationships can be considered. For example, the groups can be combined strictly based on the size of the groups as compared against the threshold. From block 116, control returns to block 114. If the check at block 114 produced a positive result, then control proceeds to block 117.

In block 117, groups are evaluated to determine which groups are related to each other. For example, a list of all routers found in the network can be cross-checked with the existing groups in the network, to discern which groups have direct relationships to one or more of the routers. For example, a group has a direct relationship with a router if the router is part of, or included in, the group. With this information a matrix can be built to indicate which routers have which groups in common, or which groups have a router in common, and this information can form a basis for combining groups. For example, thresholds permitting, groups having a router in common can be combined.

From block 117, control proceeds to block 118, where a check or test is performed whether the two smallest groups (for example in the network, across all subnets of the network) together exceed the threshold. If yes, then control proceeds to block 122, where the process ends. If no, then control proceeds to block 120, where the two smallest groups are combined to form a single group. These two smallest groups that are combined can have (or can be required to have) at least one node in common and/or another physical or logical relationship. For example, the node in common can be (or can be required to be) a router, indicating a topological relationship between the groups. From block 120, control returns to block 118. Exemplary relationships can include belonging to different subnets but having a node (e.g., a router) in common; and belonging to different subnets but having a routable (e.g., Layer 3) path between the subnets.

Figure 3:
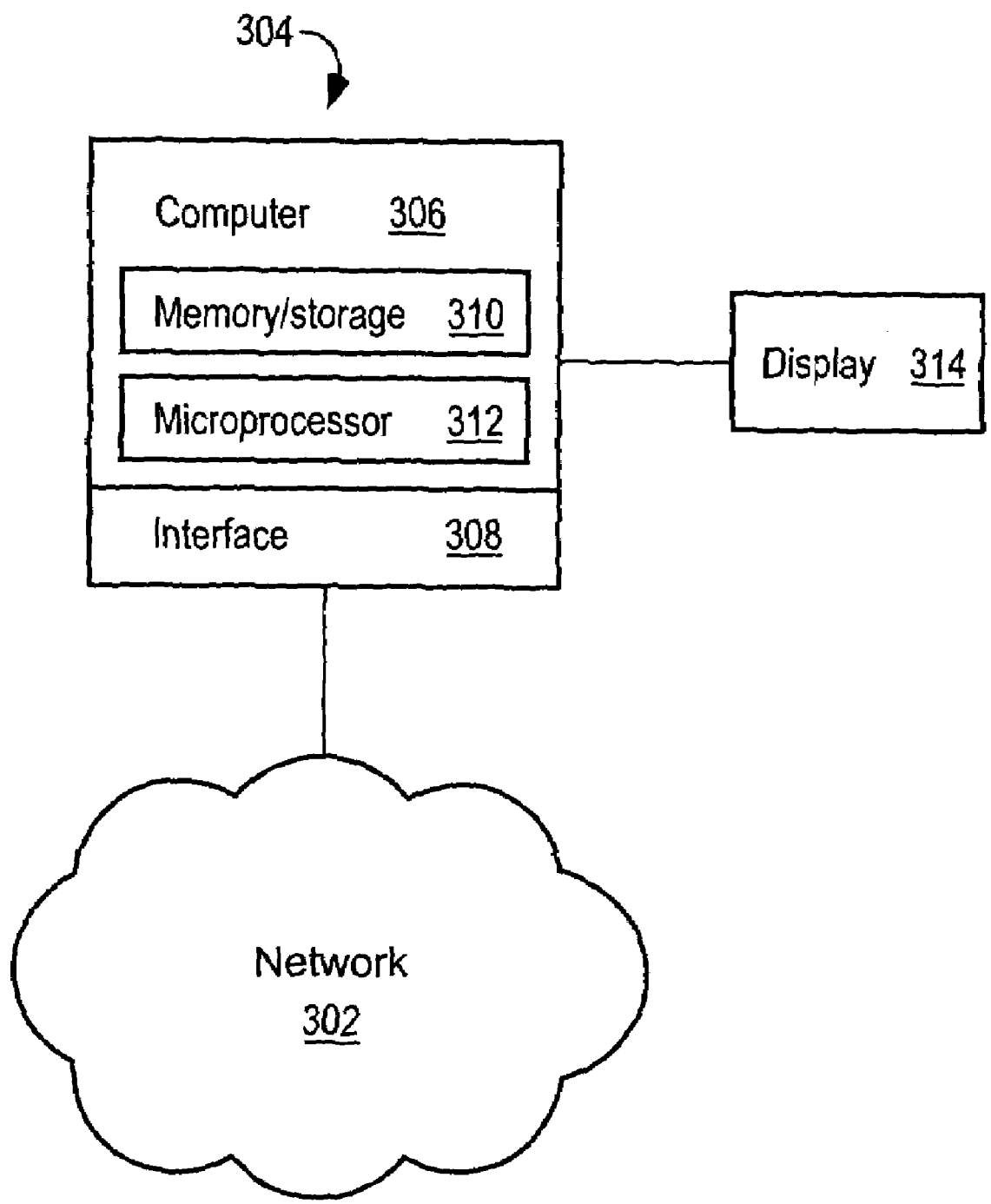
FIG. 3 illustrates an exemplary system.

Thus, in accordance with exemplary embodiments and methods variously described herein, information representing a network (for example the network 302 shown in FIG. 3) can be partitioned and divided so that the network can be represented in chunks or pieces that can be efficiently handled and stitched together by a management station or network manager (for example, the network manager 304 including a computer 306 and an interface 308 that connects to the network 302 as shown in FIG. 3). The information can be partitioned and divided so that connectivity relationships between the chunks or pieces are preserved and are also grouped to allow the network manager to efficiently manage the network. In other words, an exemplary embodiment of the invention can be visualized as including operations on graphs and/or graph relationships (representing, for example, the network and its contents) such as collapsing redundant graph connections, subject to a set of constraints. At a high level, logic can be employed to detect a need for splitting large sets of data representing portions of the network, while preserving logical network relationships across the splits. Logic can also be employed to detect a need for combining smaller sets of data representing portions of the network, based on relationships within the fabric of the network (for example, based on relationships between network elements in the same or different portions of the network), for example along a routed path and/or in accordance with OSI Layer 2 relationships. The employed logic that determines these needs can take into account or also consider a number of factors, including for example the size and complexity of the network environment being analyzed, explored and/or managed, the resources of the network manager or computer system on which the logic and the methods described herein are implemented, and an impact of the network analysis (including, for example, the operations of the logic described above, and/or the operations described in connection with FIG. 1) on the network manager.

Layers 1-7 are defined in accordance with the International Organization for Standardization's (ISO) Open Systems Interconnection (OSI) reference model, defined for example in ISO 7498, which is incorporated herein by reference in its entirety. A discussion of computer network protocols and layers of the OSI reference model is discussed, for example, in "Interconnections, Second Edition, "by Radia Perlman (Addison-Wesley, 2000), the disclosure of which is incorporated herein by reference in its entirety.

In accordance with an exemplary embodiment of a mechanism and method for automatically partitioning network environments for discovery by a discovery agent, the mechanism initially calculates a maximum zone size for a candidate discovery zone in the network, where the zone includes one or more nodes of the network. The maximum zone size can be, for example, a minimum default value or can be based on an amount of physical memory available to the discovery agent. The maximum zone size can also be based on known characteristics of the network, including for example a number or density of connections between nodes within the network.

Next, information on all nodes within the network is obtained by the automatic partitioning mechanism. This can be done for example by sending a query to a Hewlett Packard Network Node Manager (NNM) that administers to the network, or any other managing or monitoring application having information about the network. This information about the network can come from any source, including data entered or typed in by a user or administrator of the network. The partitioning mechanism then eliminates nodes from the list that are invalid or irrelevant, for example nodes not having a name, and/or nodes having an unmanaged state or no state, and also nodes without an SNMP (Simple Network Management Protocol) address.

If the total number of valid or remaining nodes is less than or equal to the maximum zone size (which can be expressed as a number of nodes), then no partitioning is needed and all nodes within the network can be placed into a single zone for discovery purposes.

If the number of nodes exceeds the maximum zone size, then the partitioning mechanism obtains information regarding or defining subnets within the network, or in other words obtains information about nodes in the network that are grouped into subnets. This information can be obtained for example by querying the NNM, or by any other method or mechanism, including those described herein with respect to obtaining information about nodes within the network.

Subnet information can include, for example, a number of each subnet, a subnet mask, and a "wild card" range representing a range of IP (Internet Protocol) addresses that include the address of the subnet. The subnet information can also include an indication of whether the subnet represents a private network address space, and can also include information about all segment objects within the subnet and all nodes within each segment object. A segment is simply a collection of connections to a physical network, and the connections can be separated from the network by infrastructure devices. In NNM, a segment can be used as a container for representing a "collision domain" at Layer 2 of the networking stack. In NNM, a segment can also be used as a container for representing a "broadcast domain" at Layer 3 of the network stack. In essence, segments can be either the "spaces between routers and hubs", or "spaces between bridges and switches".

The partitioning mechanism counts the number of segments associated with each subnet, as well as the number of nodes in each of the segments. In subnets that are private network spaces, and that have only routers and no non-router nodes in the private network space, the router nodes are not counted. Interface objects on counted nodes are likewise counted. Then for each subnet, a maximum zone size for that particular subnet is refined based for example on an interface density or on a ratio of interfaces to nodes within the subnet. The partitioning mechanism also obtains information about routers within or between the subnets.

If a number of nodes in the subnet is less than or equal to the refined maximum zone size, then there is no need to partition the subnet. Otherwise, each of the individual segment objects in the subnet is compared against the refined maximum zone size to discern whether the number of nodes within the segment exceeds the refined maximum zone size, where the refined maximum zone size is obtained by refining the previous refined maximum zone size in view of the specific nodes and node connections or configurations within the segment. Where the number of nodes in the segment exceeds the segment refined maximum zone size, then the segment is split into groups of nodes each having a number of nodes less than or equal to the segment refined maximum zone size.

After a subnet is split into baskets of components where each basket (containing, for example, a segment or some nodes from a segment) is smaller than the relevant maximum zone size, then a recombination process for baskets relating to the subnet can commence. In particular, the partitioning mechanism locates the two smallest baskets and then determines whether, if the contents of the baskets were combined, the resulting combination would be in compliance with the maximum zone size. If no, then the operation ceases. If yes, the two smallest baskets are combined to form a single basket and then the next two smallest baskets (including the new combination basket if applicable) are likewise reviewed until the baskets cannot be combined. Baskets for a given subnet can be evaluated to discern a) which baskets are "neighbors", or in other words which baskets have at least one node in common, and b) which baskets are "islands", or in other words which baskets have no nodes in common. In the recombination process, "neighbor" baskets can be combined first and then "island" baskets can be combined. The recombination process can be performed with respect to each subnet. The partitioning mechanism or one or more other mechanisms providing information to the partitioning mechanism, can evaluate the baskets to discern or determine which are neighbors and which are islands.

After the recombination process has been performed for each subnet, then the possibilities of combining baskets from different subnets or baskets comprising parts of split subnets can be explored. For example, the two smallest of all the baskets or all of the subnets can be evaluated to see if they can be combined without exceeding the maximum zone size. If they can be combined then they are combined and the process is iteratively repeated until the two smallest baskets cannot be combined. This process of combining baskets across subnets can be first performed with respect to only those baskets that share a common node or router, and can then be applied to all remaining baskets. For example, all baskets across subnets can be evaluated to discern a) which baskets are "Layer 3 neighbors", or in other words which baskets have at least one router in common, and b) which baskets are "Layer 3 islands", or in other words which baskets have no routers in common. In this recombination process for baskets across all subnets (or belonging to any subnet), "Layer 3 neighbor" baskets can be combined first and then "Layer 3 island" baskets can be combined. The partitioning mechanism or one or more other mechanisms providing information to the partitioning mechanism, can evaluate the baskets to discern or determine which are Layer 3 neighbors and which are Layer 3 islands.

FIGS. 2A-D illustrate a flowchart of an exemplary method. In particular, FIGS. 2A-D contain a flowchart of the following pseudocode:

```
setup global hashes.
calculate an initial max zone size. (e.g., look at available physical memory).
get all nodes. (e.g., NNM query).
discard invalid nodes.
get IF/node ratio for this environment & revise max zone size based on the ratio
If (all nodes < max zone size)
    then a) throw all nodes into a single zone and b) end.
else
    get subnet and router info.
    for each subnet,
        get IF/node ratio within the subnet & revise max zone size based on
            this IF/node ratio.
        count segments in subnet.
        for each segment,
            count valid nodes in segment.
            for each node, count interfaces.
            increment counts of nodes & interfaces in subnet
        refine max zone size based on subnet characteristics.
        if (subnet size < refined max zone size)
            then build search hash for entries for the subnet.
        else
            for each segment,
                count valid nodes in segment.
                count interfaces of valid nodes in segment.
                refine max zone size based in segment characteristics.
                if (nodes in segment < refined max zone size)
                    then
                        if (segment is special case, runaway segment calculation)
                            then push segment contents into special basket.
                        else place valid nodes in segment into basket for segment.
                else
                    establish number of normal baskets.
                        e.g., (normal baskets = number of nodes in
                        segment/refined max zone size)
                    apportion valid nodes into the normal baskets for the segment.
            check size of the special basket and split up if too large.
            map which baskets are "neighbors", "islands".
                (e.g., neighbors have at least one node in common,
                islands have no nodes in common).
            while (two smallest neighbor baskets are together < than the max zone
                size)
                combine the two smallest neighbor baskets into a single basket.
            while (two smallest island baskets are together < than the max zone
                size)
                combine the two smallest island baskets into a single basket.
```

```
            while (any two smallest remaining baskets combined < than the max
               zone size)
                  combine the two smallest remaining baskets into a single basket.
      map which among all baskets are "Layer 3 neighbors", "Layer 3 islands".
         (e.g., Layer 3 neighbors have one or more routers in common,
               Layer 3 islands have no routers in common).
      while (two smallest Layer 3 neighbors baskets are together < than the max
            zone size)
         combine the two smallest Layer 3 neighbor baskets into a single basket.
      while (two smallest Layer 3 island baskets are together < than the max zone
            size)
         combine the two smallest Layer 3 island baskets into a single basket.
      Formulate and print out (e.g., in XML format) zone descriptions.
```

As shown in FIGS. 2A-D, in a first block 201 the method or process begins. In a next box 202, global hashes are set up. From box 202 control proceeds to box 204, where an initial max zone size is calculated, for example based on system resources. For example, the initial max zone size can be calculated based on available system resources. From box 204, control proceeds to box 206, where all nodes in the network and their interfaces are obtained, or information about all nodes in the network is obtained, including for example information about their interfaces. From block 206 control proceeds to block 208, where invalid nodes are discarded. from block 208 control proceeds to block 209, where the ratio of interfaces to nodes for the environment is obtained and the maximum zone size is adjusted based on the obtained ratio. From block 209 control proceeds to block 210, where the group of all the nodes is tested to see if it is equal to or smaller in size than a maximum zone size (for example, the initial maximum zone size determined or calculated in block 204). If no, then control proceeds to block 214. If yes, then control proceeds to block 212, where all the nodes are thrown or grouped into a single zone or group. From block 212, control proceeds to block 282. In block 214, subnet and router information are obtained. From block 214, control proceeds to block 216, which is a test at the beginning of a loop. Specifically, block 216 tests whether there is another subnet that has not yet been processed in the loop. If no, then control proceeds to block 272. If yes, then control proceeds to block 218, where a ratio of interfaces to nodes within the subnet is obtained or calculated, and the maximum zone size is revised based on the ratio of interfaces to nodes. From block 218, control proceeds to block 220, where segments in the current subnet being processed, are counted. From block 220, control proceeds to block 222, which is a test at the beginning of a loop.

Specifically, block 222 tests whether there is another segment that has not yet been processed in the loop. If no, then control proceeds to block 230. If yes, then control proceeds to block 224, where valid nodes in the current segment (i.e., the segment currently being processed by the loop beginning at block 222) are counted. From block 224 control proceeds to block 226, where the interfaces of each node in the segment are counted. From block 226, control proceeds to block 228, where node counts and interface counts for the subnet (i.e., the current subnet of the loop beginning at block 216, and which encompasses the loop beginning at block 222) are incremented. From block 228, control returns to block 222.

In block 230, the max zone size is refined based on the subnet characteristics. The max zone size can, for example, be refined based on characteristics of the subnet currently being processed. from block 230, control proceeds to block 232 where the size of the subnet is compared against the refined maximum zone size. If the subnet size is greater than the refined maximum zone size, then control proceeds to block 236. If the subnet size is equal to or less than the refined maximum zone size, then control proceeds to block 234, where a search hash for entries for the subnet (e.g., for the subnet currently being processed) is built, and unique nodes in the subnet are assigned to a basket. From block 234, control returns to block 216.

In block 236, a test is performed at the beginning of a loop. Specifically, block 236 tests whether there is another segment that has not yet been processed. If no, then control proceeds to block 256. If yes, then control proceeds to block 238, where valid nodes in the segment (e.g., the segment currently being processed) are counted. from block 238 control proceeds to block 240, where interfaces of valid nodes in the segment are counted. From block 240 control proceeds to block 242, where the maximum zone size is (e.g., further) refined based on the segment characteristics. For example, the maximum zone size can be refined based on characteristics of the segment currently being processed. From block 242 control proceeds to block 244, where a test is performed to determine or discern whether the number of nodes in the segment (e.g., the segment currently being processed) is equal to or less than the refined maximum zone size. If no, then control proceeds to block 252, where a number of normal baskets is established. From block 252, control proceeds to block 254, where valid nodes are apportioned into the normal baskets for the segment (for example, the segment currently being processed). From block 254 control returns to block 236.

If the determination in block 244 is yes, then control proceeds to block 246, where a test is performed to discern or determine whether the segment is a special case, for example of runaway segment calculation. If no, then control proceeds from block 246 to block 250, where valid nodes in the segment are placed into a basket for the segment, and then from block 250 control returns to block 236. If the determination in block 246 is yes, then control proceeds from block 246 to block 248, where contents of the segment are pushed into a special basket. From block 248, control returns to block 236.

In block 256, a test is performed to discern or determine whether the size of the special basket is too large, and if yes then it is split up. From block 256, control proceeds to block 258, where "neighbor" relationships and "island" relationships among the baskets (for example, among baskets within a given subnet) are mapped. Baskets are "neighbors" when they have at least one node in common. Baskets that are "islands" with respect to each other have no nodes in common. From block 258, control proceeds to block 260, where a test is performed at the beginning of a loop. Specifically, block 260 contains the test for a "while . . . do" loop, where it is determined whether the two smallest neighbor baskets are together equal to or less than the maximum zone size, or in other words when combined are still equal to or less than the maximum zone size. If no, then control proceeds to block 264. If yes, then control proceeds to block 262, where the two smallest neighbor baskets are combined into a single basket. From block 262, control returns to block 260.

In block 264, a test is performed to discern whether the two smallest island baskets are together equal to or less than the maximum zone size. If no, the control proceeds to block 268. If yes, then control proceeds to block 266, where the two smallest baskets are combined into a single basket. From block 266, control returns to block 264.

In block 268, a test is performed to determine or discern whether any two smallest remaining baskets (for example, among baskets in the present subnet) are together equal to or less than the maximum zone size. If no, then control returns to block 218. If yes, then control proceeds to block 270, where the two smallest remaining baskets are combined into a single basket. From block 270, control returns to block 268.

In block 272, relationships among all baskets (for example, among all baskets in a pool including baskets from all the subnets) are mapped to determine or indicate which baskets are "Layer 3 neighbors" and which baskets are "Layer 3 islands". Baskets that are Layer 3 neighbors have at least one router in common, and Layer 3 islands have no routers in common. from block 272, control proceeds to block 274, where a test is performed to discern or determine whether the two smallest Layer 3 neighbors are together equal to or less than the maximum zone size. If no, then control proceeds to block 278. If yes, the control proceeds to block 276, where the two smallest Layer 3 neighbors are combined into a single basket. From block 276, control returns to block 274.

In block 278, a test is performed to discern or determine whether the two smallest Layer 3 island baskets are together equal to or less than the maximum zone size. If no, then control proceeds to block 282. If yes, then control proceeds to block 280, where the two smallest Layer 3 island baskets are combined into a single basket. From block 280, control returns to block 278.

In block 282, zone descriptions are formulated and printed out (for example, in eXtensible Markup Language or "XML" format). From block 282, control proceeds to block 284 where the process or method ends.

In an exemplary method, the actions shown in FIGS. 2A-2D can be supplemented or modified as follows, to take into account other logical and/or physical relationships between groups. For example, when combining groups or baskets within a subnet, the two smallest groups that are combined can have (or can be required to have) at least one node (for example a switch) in common and/or another physical and/or logical relationship. Exemplary physical or logical relationships include: the two smallest groups belonging to the same segment; and the two smallest groups belonging to different segments, but having at least one node (or Layer 2 path, or physical connection) in common. The requirements can be ordered in a hierarchy. For example, the smallest groups having at least one node (or Layer 2 path, or physical connection) in common can be combined first, and then smallest groups (that together do not exceed the threshold) belonging to the same segment can be combined, or vice versa. A hierarchy of more than two levels can be used. For example, having at least one node in common can be given first priority, having at least one physical connection in common can be given second priority, and belonging to the same segment can be given third priority. These priorities can be differently ordered, for example any of the mathematically possible orderings of these three hierarchies can be used, as well as hierarchies of greater or lesser levels than three. For example, a last priority can be given to smallest groups that have no relationship other than they belong to the same subnet. Also, some or all of the relationships can be given a same priority, and/or all or only some or even none of the relationships can be considered. For example, the groups can be combined strictly based on the size of the groups as compared against the threshold. With respect to combining groups across subnets, these two smallest groups that are combined can have (or can be required to have) at least one node in common and/or another physical or logical relationship. For example, the node in common can be (or can be required to be) a router, indicating a topological relationship between the groups, or the relationship can include a routable Layer 3 path between the subnets (or between groups from different subnets).

The pseudocode below provides an implementation of an exemplary method in greater detail. In the pseudocode below, "@" represents "array" and "%" represents "hash".

```
Start.
- Look for command line arg "maxsize=".
- Set up global hashes:
     basketSize__H
     basketContains__H
     basketInactive__H
     basketWarning __H
     subnetRanges__H
     basketContainsWCs__H
- Calculate max zone size at the environment level:
     - minimum default = 150;
     - get__sys__mem( ); (Look at physical memory, and maxdsiz on HPUX).
     - Set the global max__per__zone basis to be between 150 and 250, based on
conditions. If maxsize= argument was given, use this number instead (if >0).
- @all__nodes = all discovered nodes in the environment.
Trim down the list of all nodes to be only those that are valid:
- Eliminate those without NAME, those with an unmanaged state or no state,
those without an SNMP__ADDRESS.
- Build all__nodes__H search hash.
- Get an IF/node ratio for this environment and use it to revise the global max up
or down.
```

```
- If (the total number of valid nodes to discover < = max_per_zone) {
        No partitioning is needed. All nodes go into one zone.
        @nets = all subnet topology objects. (e.g., query to gather subnet
            information)
        foreach (net) {
            - Get its network number (ex. 15.6.96.0).
            - Get its network mask (ex. 255.255.255.248).
            - Calculate the wildcard range that represents this subnet.
            Now, whittle down the list of explicit nodes to write an XML entry for:
            @segs = all segment objects in this net.
            foreach (segment) {
                @nodes = node objects for this segment.
                foreach (node) {
                    if it is a valid node {
                        $net has_nodes = true;
                        Clear this node out of the hash of valid loner nodes,
                        since it has a wildcard representation.
                    }
                }
            }
            if (net_has_nodes) {
                Add the net and its wildcard range string to the subnetRanges_H hash,
                keyed on net id.
            }
        } end for each (net)
        - Create the new XML zone section with everything in one zone.
            - Wildcards are written out first. Then if any explicit nodes are left
            without a wildcard representation, write them out also.
        - Splice the new XML into the XML configuration (overwriting old zones, but
        preserving special zones, like overlapping IP address domain zones for
            example).
        - Output status showing the partitioning to be done.
        - Exit(0);
} else { Partitioning of the environment is needed:
        @nets = all subnet objects. (e.g., query to gather subnet information)
        @all_routers = all router objects. (e.g., query to gather router information)
        - Build a search hash of the routers.
        foreach (net or subnet) {
            - Get the network number (ex. 15.6.96.0).
            - Get the subnet mask (ex. 255.255.255.248).
            - Determine if it is a IANA-reserved private network address space. (And
            optionally, APIPA private addresses)
            Determine if this subnet needs to be broken up:
            - Get an IF/node ratio within this subnet and use to revise the global max
                up or down.
            @segs = all seg objects for this subnet.
            foreach (segment) {
                - increment the count of segments associated with this subnet.
                @nodes = all nodes in this seg.
                foreach (node) {
                    next (skip node) if it isn't in our valid list. // otherwise...
                    net_has_nodes = true;
                    If (net is a private network space) {
                        if (we haven't yet found a non-router in this subnet) {
                            if (node is not found in our router hash) {
                                priv_net_has_non_routers = true;
                            } end if
                        } end if
                    } end if
                    @interfaces = all interface objects on this node.
                    - Count the interfaces.
                    - Increment the count of nodes in this subnet.
                    - Increment the count of interfaces in this subnet.
                } end for each (node)
            } end for each (segment)
            if ((we found over 1000 segments in the subnet) or (the number of
            segments > = 3*number of nodes in this subnet)) {
                For robustness, flag this subnet as a case for special handling.
                Segment data is bogus and the result of run-away calculation
                in a meshed environment.
                looney_toons = true;
            } end if
```

```
-- Now refine our max zone size to be specific to this subnet, based upon
interface density (yields: refined_max_zone_size).
if (the number of nodes in this subnet < = refined_max_zone_size) {
    This subnet can be an atomic unit! No need to partition it.
    if (the subnet is a private net with nodes) {
        Note: It is possible to discover a private subnet via a router with
        a non-private SNMP address. If the private subnet contains only
        routers that have non-private addresses, then those routers are
        represented in one of the other non-private subnets. Hence, the
        private net wildcard does not describe any nodes that haven't
        already been described, and therefore their wildcard doesn't need
        to be in the zone configuration.
        if (it contains non-router nodes) {
            - push the wildcard range onto the basketContainsWCs_H
            hash for this net.
        } end if
    } else if (the subnet has nodes) {
        - push the wildcard range onto the basketContainsWCs_H
        hash for this subnet.
    } end else if
    - Build a search hash for the existing entries for this subnet in
    basketContains_H.
    foreach (segment) {
        @nodes = all nodes objects in this segment.
        foreach (node) {
            If it is not in our hash of valid nodes {skip it}
        else {
            Check hash to see if node is already in this basket.
            if (not_there) {
                Build up our zone basket for this subnet.
                Push it onto the basketContains_H list for
                this subnet.
                Add a node entry to the existing_entries_H
                hash.
                Increment the size of this basket in
                basketSize_H hash.
            } end if
        } end else
        } end for each (node)
    } end for each (segment)
    If (0 is not already there) {- Push a value of 0 (no warning) onto the
        basketWarning_H hash for this net, since partitioning is solid.
    } end if
} else {
    This subnet can't be atomic. It needs to be partitioned!!!
    % nodeBaskets_H;
    @new_net_parts;
    % split_seg_members;
    Check each segment to see if it needs to be split itself:
    foreach (segment) {
        @seg_nodes = all node objects in this segment.
        foreach (node) {
            next (skip it) if it is not a valid node.
            increment count of nodes in this segment.
            @seg_node_interfaces = interface objects in this segment.
            increment the iF count for this seg by the number on this node.
        } end for each (node)
        - Refine the max zone size based on the data for this segment.
        if (number of nodes in this seg > seg_refined_max_zone_size) {
            This segment needs to be split.
            seg_baskets_needed = ceiling (number of nodes in seg /
                seg_refined_max_zone_size).
            for (part_index = 0; part_index < seg_baskets_needed;
                increment part index) {
                new_key = seg . "_" . part_index;
                - Push new_key onto new_net_parts.
                - Push warning code of 1 (split seg) onto
                basketWarning_H hash for this key, if not there.
                foreach valid seg node {
                    last (abort loop) if
                    basketContainsH{newkey} has reached
                    seg_refined_max_zone_size. // otherwise...
                    - Push the node onto split_seg_members
                    hash for the new_key.
```

-continued

```
                - Push the node onto basketContains_H
                  hash for the new key.
                - Delete the node from the temp list of
                  valid seg nodes.
            } end for each
        } end for
    } else {the segment can be atomic! Don't split it.
        if (num_nodes_in_seg == 1 AND looney_toons) {
            This is a case of run-away segment calculations.
            Handle this by making a basket to collect all
            these special case nodes. The key is 0.
            if (the special basket doesn't already exist) {
                push 0 onto new_net_parts array.
            } end if
            @nodes = all node objects for this segment.
            foreach (node) {
                next (skip it) if it is not a valid node.
                if (the special basket, basketContains_H{0}
                    exists) {
                    if (the node isn't already in the
                        special basket) {
                        - Push it on the special bask.
                    } end if
                } else {
                    - Push node onto the special basket.
                    - Push warning code of 2 onto
                      basketWarning_H for this basket, if
                      not there.
                } end else
            } end for each (node)
        } else {It's a normal atomic segment, not a special case.
            Place it in its own basket.
            - Push seg onto net_net_parts.
            @nodes = all node objects for this segment.
            foreach (node) {
                next (skip it) if it is not in valid node hash.
                - Push node onto basketContains_H hash
                  for segment.
                - Push a warning code of 1 onto
                  basketWarnings_H for seg, if not there.
            } end for each (node)
        } end else
    } end else (segment can be atomic)
} end for each (segment)
Now, if our special basket is too large, split it up:
if (size of special basket > refined_max_zone_size) {
    special_baskets_needed = ceil (size of special bask /
    refined_max_zone_size);
    - Basically, we split up the excess in basket 0 into a
    special_baskets_needed baskets with keys 0-<suffix>, and
    remove the overflow from basket 0.
    - Push warning code of 2 onto each of the new special baskets.
} end if
Now, for each basket (which here is a seg or part of a seg), map
which ones are "neighbors" of each other (share nodes in common),
find basket sizes, etc., in preparation for possible merging of the
baskets:
foreach (basket_name in new_net_parts) {
    if (this basket has an entry in split_seg_members) {
        @basket_nodes = @{split_seg_members{basket_name}}.
    } else {
        if (basket_name < = 0) { it's a special basket.
            @basket_nodes =
            @{basketContains_H{basket_name}}.
        } else {
            @basket_nodes = all nodes objects for this basket
                (segment).
        } end else
    } end else
    foreach (node in @basket_nodes) {
        next (skip it) if it is not in the valid node hash. Otherwise:
        if (there is no nodeBaskets_H entry for this node) {
            Push this basket name onto the nodeBaskets_H list
            for this node.
        } else {
            This node was in other baskets, so we know that
            this basket is a "neighbor" of those baskets, and
            vice versa!
            foreach (nbr in @{nodeBaskets_H{node}}) {
```

-continued

```
                    if (basket_name and nbr aren't already
                        neighbors) {
                            Push nbr on basketNbrs_H list for
                            basket_name.
                            Push basket_name on basketNbrs_H
                            list for neighbor.
                    } end if
                } end for each
                push basket_name on nodeBaskets_H list for node.
        } end else
    } end for each (node)
    if (there is no entry in basketNbrs_H for basket_name) {
            This basket is an island. It does not share any nodes
            with any of the other baskets.
            Push basket_name onto nets_island_baskets.
    } end if
} end for each (basket)
At this point we have a set of atomic baskets for pieces of this subnet,
and a hash table of relationships between the baskets. We now
attempt to combine the baskets, algorithmically.
First, attempt baskets with neighbors:
while (not done collapsing graph connections (combining related
baskets)) {
    Note: All baskets start off as "active" until it is found they can no
    longer be combined.
    Find the smallest sized active basket(s) that have neighbors.
    Now out of all the smallest baskets, if there is more than one, use
    the one with the least number of neighbors. If there are more
    than one of those, use the first encountered. If none, we are done
    with this part, so break.
    We now have our Merge Candidate 1 (MC1). Now find the
    second candidate, which is MC1's smallest active neighbor
    basket. Decision is similar to that for MC1.
    if (we found an MC2) {
            if (the combined size of MC1 and MC2 would be
            acceptable (less than the max)) {
                    MERGE THEM!
                    - Add MC2's Contains entries to MC1's Contains
                    list, if it isn't already there, + + MC1's size, and
                    delete MC2's Contains entry.
                    - Merge the warnings entries into MC1's.
                    - Add MC2's neighbor list entries to MC1's
                    neighbor list, if not there already.
                    - In ALL neighbor hash entries, remove ALL
                    references to MC2 and replace them with
                    references to MC1, avoiding duplicates.
                    - Remove MC2's entries in the basketNbrs_H hash
                    and basketSizes_H hash.
            } else {
                    Mark MC1's basket as inactive.
            }
    }
} end while
At this point, all baskets from this net with neighbors have been
merged with each other as much as possible. Now look at baskets
derived from this net that have no neighbors, and attempt to
consolidate them with other baskets.
while (all island baskets are not done) {
    Perform steps to merge island baskets, the steps are very similar
    to those to merge baskets above, only our working set is the set
        of island baskets:
        if (two candidates were found AND combined size of MC1 and
            MC2 < refined_max_zone_size){
                Proceed in a manner similar to the merging described
                above.
        } else {
            all_islands_done = true;
            last (exit the loop);
        } end else
} end while
At this point, all of the islands have been combined as much as
possible.
Now, of all remaining baskets, try to combine. Note: remaining non-
island baskets are the remaining keys of basketNbrs_H hash. The
remaining island baskets are the remaining values in
nets_island_baskets array.
```

-continued

```
            while (all remaining baskets are not marked as done) {
                    try to combine remaining baskets (Note, steps are very similar to
                    the merging described above).
            } end while
        } end else (net needs partitioning)
    } end for each (net)
} end else (partitioning of the environment is needed)
```
At this point all of our big subnets have been split. All baskets are below the max
zone size so the scalability constraint is minimally satisfied. (The zone baskets
contain either small atomic nets, or pieces of nets (segments or parts of segments)
which underwent splitting and coagulation above.) But, we may have many small
zone baskets that should be consolidated due to performance (minimizing the
number of multi-zone nodes needed, having zones of even distribution and near-
optimal sizes) and zones reflecting real-world physical or logical relationships.
Find some Layer 3 relationships, by finding which baskets have which routers in
common. These baskets are therefore Layer 3 "neighbors":
```
foreach (router in the all_routers array) {
        foreach (basket in the keys of basketContains_H hash) {
                @basket_nodes = the nodes in this basket.
                foreach (bnode in basket_nodes array) {
                        if (bnode == router) {
                            - Push this basket key onto the router_to_baskets_H
                            hash list for this router.
                            - Break out of this loop (last).
                        } end if
                } end for each (bnode)
        } end for each (basket)
} end for each (router)
while (all router keys in the router_to_baskets_H hash haven't been examined) {
        Find router(s) with the least number of neighboring baskets, but at least 2,
        that is not marked as done. (If more than one, pick last encountered.)
        if (a router fitting this description was not found) {
                all_routers_done = true;
        } else {
                while (router hasn't been marked as inactive ("inactive" meaning
                        we're done with it)) {
                        -Get the names of all the baskets that share locality with
                        this router from the router_to_baskets_H hash.
                        Now proceed with attempting to find merge candidates and
                        merge them. The algorithm is very similar to the merging
                        algorithms above, with the additional step of merging
                        basketContainsWCs_H entries for wildcarded descriptions:
                        if (2 candidates were not found or they are not able to be merged
                                due to size violation) {
                                - Mark router as inactive.
                        } end if
                } end while
        } end else
} end while (all routers not done)
Now handle the merging of island (remaining) baskets:
while (all islands are not done (haven't been examined)) {
        Now proceed with attempting to find merge candidates and merge them. The
        algorithm is very similar to the merging algorithms above, with the additional
        step of merging basketContainsWCs_H entries for wildcarded descriptions:
        if (2 candidates were not found or they are not able to be merged
                due to size violation) {
                all_islands_done = true;
                last (exit the loop);
        } end if
} end while (islands not done)
Now, in final preparation for representing the zones, clean up each basket by
removing explicit nodes that are part of a wildcard range representation already for
that basket:
foreach (basket_key in the keys of basketContainsWCs_H hash) {
        @this_WC_list = the array of wildcards for this basket (zone), as stored in
        basketContainsWCs_H{basket_key};
        foreach (wc_spec in @this_WC_list) {
                @this_explicit_list = the list in basketContains_H{basket_key};
                foreach (explicit_member in this_explicit_list) {
                        nodeAddr = the SNMP communication address for explicit_member;
                        Check nodeAddr against the wildcard pattern, wc_spec.
                        if (nodeAddr matched the wc_spec pattern) {
                                Splice (remove) the explicit_member from the
                                basketContains_H hash list entry (explicit) for basket_key.
                        } end if
                } end for each (explicit_member)
        } end for each (wc_spec)
} end for each (basket_key)
```

```
-continued

Now, formulate and print out (to XML) the zone descriptions, and
Preserve any zone configuration entries for zones that are not affected (like zones
for overlapping IP address domains):
foreach (zone key of basketContains_H hash (the remaining zone basket names)) {
    if (the zone isn't empty) {
        Formulate XML zone entry for this zone key consisting of:
            - Cumulative warning value of all warnings in its
              basketWarnings_H hash list for this basket.
            - Each of the wildcard descriptions associated with this zone entry.
            - Each remaining explicit node associated with this zone entry.
    } end if
} end for each (zone key/basket name)
Now splice the new zone XML section into the larger existing XML file.
Automatic network partitioning and scalable zone configuration is now complete!
End.
```

In accordance with an exemplary method and/or mechanism described below and consistent with the principles outlined herein, the need for user involvement in the process of configuring zones of a network is eliminated or nearly eliminated. The exemplary method includes partitioning the network into zones or sections for scalability and performance purposes, so that the following constraints (in rough order of importance) can be observed: 1) Accuracy—Fabrics or sections/portions of the network are not split in ways that cause topology discovery to be inaccurate. Instead, real-world physical and logical relationships are captured or detected, and are accounted for in the partitioning process of the exemplary method. 2) Scalability—No zone exceeds a calculated maximum zone size. 3) Performance—As few zones as possible are below the minimum size. This can almost always mean that no zones are below a minimum size. Also, as few zones as possible are below the minimum zone size, which in practice can mean that no zones are below the minimum zone size. As an effect of the algorithm, the number of objects or system resource burden across zones can tend to be evenly distributed, and zones can tend toward near-optimal size. Information may be available to this exemplary method from previous discoveries. The method can make the best decisions possible given only what information has been or can be determined from the network at the time of partitioning. The method can make enhanced decisions in the presence of future information that may result from more detailed discovery. In other words, a feedback mechanism can be implemented to allow information discovered after a network is partitioned, to be incorporated in future partition optimization. If the total number of managed nodes does not exceed a maximum (or optimal) size threshold, there is no need to break up the network into zones. Otherwise, partitioning can proceed by first breaking up the set of all nodes in the network into zones based on subnets.

Pre-gathered data about subnets or subnet membership within the network can be leveraged or used to avoid breaking up switch fabrics within the network. Breaking of switch fabrics can be avoided, for example, by dividing or partitioning along router boundaries where possible. For each preliminary proposed new zone, the method can calculate a set of maximum zone size numbers, based on such factors as port density or connection density, system memory (for example of a network manager on which the method is wholly or partially implemented), and so forth.

If any subnet is larger than the maximum zone size, then it can be broken into atomic pieces, which can be its segments (as seen, for example, by the Networks view and/or the Segments view of Hewlett Packard's Network Node Manager (NNM)). Segments can be treated as the smallest, indivisible atomic units in partition analysis to avoid breaking up broadcast domains. If, however, a segment itself violates the maximum zone size constraint, the segment can be algorithmically partitioned to produce candidate baskets of zones or zone portions. Logic can then be used to reassemble those whole or partial segment pieces into appropriately sized candidate zones, or into partial zone baskets that include segments that are advantageously grouped together. These groupings also can be organized to minimize an amount of future duplicate queries necessary to single nodes that reside in multiple zones. The partitioning can also be organized to result in an even or fairly even distribution across zones. Specific relationships in the layout of the network can be used to ensure that fabrics of the network are not improperly split across zones and that members of the same zone share key properties or topological relationships.

At this point, all zones are below the maximum allowable zone size. However, it may be the case that there are many small zones, each representing a switched domain between routers, and including only a few nodes (e.g., switches) each. Combining these zones offers not only the benefit of minimizing some discovery overhead and duplication by having fewer zones, but also minimizes the chances of inaccuracy in discovery by minimizing the number of zone splits, and hence possible splits of fabrics. The zone-merging method attempts to capture and/or take into consideration physical locality relationships that are common in many network designs (campus, etc.), such that zones along a routed path, or separated by one common router (and hence more likely to be physically closer) are merged.

There may be zone candidate baskets that are topological islands, that for the purpose of defining zones and partitions do not have significant topological relationships with other refined zone baskets. These "islands" can be merged into existing zones, for example where most appropriate.

At this stage, partitioning is complete. Newly discovered information (such as changes in the network, and so forth) can be captured and used on subsequent runs of partitioning, for example as a factor in what constitutes an indivisible atomic unit for purposes of optimizing performance of the network manager, and the zones can be refined to account for or take advantage of the new information. The method or mechanism (for example, the method implemented partially or completely on a network manager) can also determine when available data may be inaccurate and can partition the network into zones taking into account the possible inaccuracies.

FIG. 3 illustrates a block diagram of a system for managing a network of nodes, for example by grouping or partitioning the nodes. The network manager or management station 304 is capable of performing the functions described herein. As shown in FIG. 3, the network manager 304 can include a computer 306 having a memory storage 310, a microprocessor 312, and an interface 308 that connects to the network 302 that the network manager 304 is discovering, monitoring and/or managing. The computer 306 can receive information identifying the nodes of the network, for example via the interface 308, and can group the nodes into zones as a function of relationships among the nodes, such that each zone satisfies a threshold that is based on an operational capacity of a discovery agent assigned to discover the network. The discovery agent can be via software operating in one or more nodes of the network 302, can be implemented by software operating on the computer 306, and can implemented via software operating on hardware that is external to both the computer 306 and the network 302, and in communication with the computer 306 (either directly or indirectly, via the network 302, and/or the interface 308, or another interface to the computer 306).

The computer 306 can perform the functions of evaluating each group with the threshold that is based on an operational capacity of a discovery agent assigned to discover the network, and dividing each group exceeding the threshold into new groups. The computer 306 can also perform the evaluating and dividing until all groups do not exceed the threshold, can combine two of the groups to form a single group that does not exceed the threshold, and can repeat the combining until no further combinations not exceeding the threshold are possible. The groups can be subnets, segments of subnets, or subsets of segments. The two groups can be the two smallest groups of all the groups, the two groups can be the smallest groups within a single subnet, and the two groups can have at least one node in common. The two groups can have at least one router in common.

The functions described herein and performed by the computer 306 and/or the network manager 304 can be implemented via a single software module or different software modules running on the computer 306, and by a single microprocessor or multiple microprocessors within the computer 306. Alternatively, these functions and other functions described herein can be implemented or performed using resources of the network, or using software and hardware resources operating independently of the network and the network manager, in a central or distributed fashion or configuration, and can provide advisory information to the network manager and/or control or direct the network manager.

For example, functions of collecting information identifying the nodes of the network, which information can include information identifying features, characteristics and configurations of nodes in the network as well as descriptions of relationships among nodes in the network, can be implemented within or in conjunction with Hewlett Packard's OpenView and Network Node Manager (NNM) products, including NNM Extended Topology (ET). For example, the network manager 304 can use NNM Discovery and/or NNM ET to obtain information about the network 302, for example topology, number of nodes, number of interfaces, connection densities, and so forth. NNM ET can be used to provide additional detail, for example more Layer 2 data or Layer 3 data, details regarding connections between nodes within the network 302, protocols, switches, and so forth.

The network manager 304 or computer system 306 can drive a display 314, for example to show a status or activity of the network manager 304 including calculus, status, and/or results relating to partitioning operations, discovered network information, and so forth.

The methods, logics, techniques and pseudocode sequences described above can be implemented in a variety of programming styles (for example Structured Programming, Object-Oriented Programming, and so forth) and in a variety of different programming languages (for example Java, C, C++, C#, Pascal, Ada, and so forth).

Those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. A method for managing a network of nodes, comprising:
   receiving information identifying the nodes of the network; and
   grouping the nodes into zones as a function of relationships among the nodes, such that each zone satisfies a threshold that is based on an operational capacity of a discovery agent assigned to discover the network, wherein the threshold is refined based on a ratio of a number of interfaces to a number of nodes in the group.

2. The method of claim 1, wherein the nodes are organized in groups and the grouping comprises:
   evaluating each group with the threshold that is based on an operational capacity of a discovery agent assigned to discover the network; and
   dividing each group exceeding the threshold into new groups.

3. The method of claim 2, wherein the groups are subnets, segments of subnets, or subsets of segments.

4. The method of claim 2, comprising performing the evaluating and dividing until all groups do not exceed the threshold.

5. The method of claim 4, comprising combining two of the groups to form a single group that does not exceed the threshold.

6. The method of claim 5, comprising repeating the combining until no further combinations not exceeding the threshold are possible.

7. The method of claim 5, wherein the two groups are the two smallest groups of all the groups.

8. The method of claim 7, wherein the two groups are the smallest groups within a single subnet.

9. The method of claim 8, wherein the two groups have at least one node in common.

10. The method of claim 7, wherein the two groups have at least one node in common.

11. The method of claim 10, wherein the at least one node in common is a router.

12. The method of claim 1, comprising refining the threshold based on group characteristics.

13. A system for managing a network of nodes, comprising:
- means for receiving information identifying the nodes of the network, and grouping the nodes into zones as a function of relationships among the nodes, such that each zone satisfies a threshold that is based on an operational capacity of a discovery agent assigned to discover the network;
- means for connecting to the network; and
- means for refining the threshold based upon group characteristics, wherein the threshold is refined based on a ratio of a number of interfaces to a number of nodes in the group.

14. The system of claim 13, wherein the nodes are organized in groups and the means for receiving information and grouping the nodes evaluates each group with the threshold that is based on an operational capacity of a discovery agent assigned to discover the network, and divides each group exceeding the threshold into new groups.

15. The system of claim 14, wherein the groups are subnets, segments of subnets, or subsets of segments.

16. The system of claim 14, wherein the means for receiving information and grouping the nodes performs the evaluating and dividing until all groups do not exceed the threshold.

17. The system of claim 16, wherein the means for receiving information and grouping the nodes combines two of the groups to form a single group that does not exceed the threshold.

18. The system of claim 17, wherein the means for receiving information and grouping the nodes repeats the combining until no further combinations not exceeding the threshold are possible.

19. The system of claim 17, wherein the two groups are the two smallest groups of all the groups.

20. The system of claim 19, wherein the two groups are the smallest groups within a single subnet.

21. The system of claim 20, wherein the two groups have at least one node in common.

22. The system of claim 19, wherein the two groups have at least one node in common.

23. The system of claim 22, wherein the at least one node in common is a router.

24. A machine readable medium for storing a computer program for causing a computing device to perform:
- receiving information identifying the nodes of the network; and
- grouping the nodes into zones as a function of relationships among the nodes, such that each zone satisfies a threshold that is based on an operational capacity of a discovery agent assigned to discover the network.
- wherein the computer program causes the computing device to perform a refining of the threshold based on the group characteristics, and
- wherein the threshold is refined based on a ratio of a number of interfaces to a number of nodes in the group.

25. The machine readable medium of claim 24, wherein the nodes are organized in groups and the grouping comprises:
- evaluating each group with the threshold that is based on an operational capacity of a discovery agent assigned to discover the network; and
- dividing each group exceeding the threshold into new groups.

26. The machine readable medium of claim 25, wherein the groups are subnets, segments of subnets, or subsets of segments.

27. The machine readable medium of claim 25, wherein the computer program causes the computing device to perform the evaluating and dividing until all groups do not exceed the threshold.

28. The machine readable medium of claim 27, wherein the computer program causes the computing device to perform combining two of the groups to form a single group that does not exceed the threshold.

29. The machine readable medium of claim 28, wherein the computer program causes the computing device to repeat the combining until no further combinations not exceeding the threshold are possible.

30. The machine readable medium of claim 28, wherein the two groups are the two smallest groups of all the groups.

31. The machine readable medium of claim 30, wherein the two groups are the smallest groups within a single subnet.

32. The machine readable medium of claim 31, wherein the two groups have at least one node in common.

33. The machine readable medium of claim 30, wherein the two groups have at least one node in common.

34. The machine readable medium of claim 33, wherein the at least one node in common is a router.

* * * * *

UNITED STATES PATENT AND TRADEMARK OFFICE
CERTIFICATE OF CORRECTION

PATENT NO. : 7,454,488 B2  Page 1 of 1
APPLICATION NO. : 10/667332
DATED : November 18, 2008
INVENTOR(S) : Gabriel Wechter et al.

It is certified that error appears in the above-identified patent and that said Letters Patent is hereby corrected as shown below:

In column 11, line 16, delete "$net has_nodes" and insert -- $net_has_nodes --, therefor.

In column 13, line 72, delete "{newkey}" and insert -- {new_key} --, therefor.

In column 25, line 14, in Claim 13, delete "upon" and insert -- on --, therefor.

In column 26, line 8, in Claim 24, after "network" delete "." and insert -- , --, therefor.

In column 26, line 10, in Claim 24, after "based on" delete "the".

Signed and Sealed this

Twenty-eighth Day of July, 2009

JOHN DOLL
*Acting Director of the United States Patent and Trademark Office*